United States Patent [19]

Isobe

[11] Patent Number: 5,251,323
[45] Date of Patent: Oct. 5, 1993

[54] VECTOR PROCESSING APPARATUS INCLUDING TIMING GENERATOR TO ACTIVATE PLURAL READOUT UNITS AND WRITING UNIT TO READ VECTOR OPERAND ELEMENTS FROM REGISTERS FOR ARITHMETIC PROCESSING AND STORAGE IN VECTOR RESULT REGISTER

[75] Inventor: Youko Isobe, Yamanashi, Japan

[73] Assignee: NEC Corporation, Tokyo, Japan

[21] Appl. No.: 505,685

[22] Filed: Apr. 5, 1990

[30] Foreign Application Priority Data

Apr. 6, 1989 [JP] Japan .................................... 1-87688

[51] Int. Cl.⁵ .......................................... G06F 15/347
[52] U.S. Cl. ..................... 395/800; 395/550; 364/DIG. 1; 364/232.21; 364/251; 364/251.4
[58] Field of Search ..................... 395/800, 550, 425; 364/736

[56] References Cited

U.S. PATENT DOCUMENTS

| | | | |
|---|---|---|---|
| 3,900,723 | 8/1975 | Bethany et al. | 395/800 |
| 4,490,786 | 12/1984 | Nakatani | 395/800 |
| 4,641,275 | 2/1987 | Hatakeyama et al. | 395/800 |
| 4,658,355 | 4/1987 | Hatakeyama et al. | 395/800 |
| 4,661,900 | 4/1987 | Chen et al. | 395/800 |
| 4,757,444 | 7/1988 | Aoyama et al. | 395/800 |
| 4,949,247 | 8/1990 | Stephenson et al. | 395/800 |
| 4,949,292 | 8/1990 | Hoshino et al. | 395/800 X |

FOREIGN PATENT DOCUMENTS 0053457 6/1982 European Pat. Off. .
WO88/09016 11/1988 PCT Int'l Appl. .

OTHER PUBLICATIONS

"The architecture of pipelined computers", Graw-Hill, 1981, pp. 39–49, chapter 2.2.
Lin, H. X., et al., "Parallel Vector Reduction Algorithms and Architectures," *Journal of Parallel and Distributed Computing*, vol. 5, pp. 103–130, 1988.
Cheng, Hui, "Vector Pipelining, Chaining and Speed on the IBM 3090 and Cray X-MP," *Computer*, 1989, pp. 31–46.

*Primary Examiner*—Paul V. Kulik
*Attorney, Agent, or Firm*—Foley & Lardner

[57] ABSTRACT

In vector processing apparatus comprising operand vector registers (11a, 12a) each storing a plurality of vector operand elements, each of readout units (16a, 17a) successively reads a predetermined number of the vector operand elements out of the respective operand vector registers at a predetermined cycle time. The vector operand elements are supplied to arithmetic logic units (25, 30) from the respective operand vector registers. One of the arithmetic logic units is supplied with result elements from another of the arithmetic logic units. The predetermined number of the result elements are successively written in a result vector register (32a) at the predetermined cycle time by a writing unit (33a). With this vector processing apparatus, it is possible to perform iterative operation in parallel at a high speed under simple control.

3 Claims, 4 Drawing Sheets

VECTOR PROCESSING APPARATUS INCLUDING TIMING GENERATOR TO ACTIVATE PLURAL READOUT UNITS AND WRITING UNIT TO READ VECTOR OPERAND ELEMENTS FROM REGISTERS FOR ARITHMETIC PROCESSING AND STORAGE IN VECTOR RESULT REGISTER

BACKGROUND OF THE INVENTION

This invention relates to vector processing apparatus and, in particular, to vector processing apparatus for performing iterative operation at a high speed.

Iterative operations requires a previous result of operation for subsequent operation. That is, the an iterative operation is generally given by a general an equation:

$$x(i) = f(x(i-1)), \quad (1)$$

where i represents a positive integer and $f(x(i-1))$ denotes a function of a variable $x(i-1)$.

Attention will be directed to an example of the iterative operation which is given by a particular equation:

$$x(i) = b(i) + a(i)*x(i-), \quad (2)$$

where a(i) represents each of primary vector operand elements of first vector operand data and b(i) represents each of secondary vector operand elements of second vector operand data.

In order to perform the iterative operation given by the particular equation (2), a conventional vector processing apparatus comprises a first operand vector register for storing the first vector operand data and a second operand vector register for memorizing the second vector operand data.

A first readout unit reads one of the primary vector operand elements of the first vector operand data out of the first operand vector register as a primary read element to supply to a multiplying unit the primary read element as a primary input element of first input data. In the manner which will become clear as the description proceeds, the multiplying unit is supplied with a secondary input element of second input data. The multiplying unit carries out a multiplication operation on the primary input element of first input data and the secondary input element of second input data to produce a primary result element of first result data.

The primary result element of the first result data is delivered to an adding unit as a ternary input element of third input data. A second readout unit reads one of the secondary operand elements of the second vector operand data out of the second operand vector register as a secondary read element to supply the secondary read element to the adding unit as a quaternary input element of fourth input data. The adding unit carries out an addition operation on the ternary input element of third input data and the quaternary input element of fourth input data to produce a secondary result element of second result data.

A writing unit writes the secondary result element of the second result data in a result vector register as a vector result element of vector result data. The secondary result element of the second result data is delivered to the multiplying unit as a following secondary input element of the second input data.

In general, each of the multiplying unit and the adding unit is operable under pipeline control. It is assumed that the multiplying unit and the adding unit are operable under six-stage and four-stage pipeline control, respectively. In this event, it takes twelve machine cycles to provide the vector result element of the vector result data in the manner which will later be described. Therefore, the conventional vector processing apparatus can not give full play to its ability for performing the iterative operation.

In order to suppress deterioration in performance of a process as regards the iterative operation, a time-sharing method is disclosed in the specification of U.S. Pat. No. 4,757,444 issued to Tomoo Aoyama et al and assigned to Hitachi, Ltd. According to Aoyama et al, the particular equation (2) is modified into a modified equation as follows:

$$x(i+1) = (b(i)*a(i+1) + b(i+1)) + (a(i)*a(i+1))*x(i-1).$$

The iterative operation given by the modified equation is time-sharingly performed by using the multiplying unit and the adding unit. However, vector processing apparatus carrying out the time-sharing method must carry out complex control in the manner which will later be described.

SUMMARY OF THE INVENTION

It is an object of the present invention to provide vector processing apparatus which can perform iterative operation under simple control.

Other objects of this invention will become clear as the description proceeds.

Vector processing apparatus to which this invention is applicable, comprises a first operand vector register for storing first vector operand data consisting of a plurality of primary vector operand elements, a second operand vector register for storing second vector operand data consisting of a plurality of secondary vector operand elements, first input register connected to the first operand vector register for holding each of the primary vector operand elements of the first vector operand data as a primary input element of first input data, a second input register for holding a secondary input element of second input data, a first arithmetic logic unit operable under M-stage pipeline control and connected to the first and second input registers for carrying out a first operation on first and second input data to produce first result data consisting of a plurality of primary result elements, where M represents a first predetermined natural number, a third input register for holding a ternary input element of third input data, a fourth input register connected to the second operand vector register for holding each of the secondary-vector operand elements of the second vector operand data as a quaternary input element of fourth input data, a second arithmetic logic unit operable under N-stage pipeline control and connected said third and said fourth input registers for carrying out a second operation on the third and fourth input data to produce second result data, consisting of a plurality of secondary result elements, where N represents a second predetermined natural number, a first readout unit connected to the first operand vector register for reading the first vector operand data out of the first operand vector register to supply the first vector operand data to the first input register as the first input data, a second readout unit connected to the second operand vector register for reading the second vector operand data out of the second operand vector register to supply the second vector operand data to the fourth input register as the fourth input data, first delivering means for delivering the first result data from the first arithmetic logic unit to the third input register as the third input data, second delivering means for delivering the second result data from the second arithmetic logic unit to the second input register as the second input data a result register connected to the second arithmetic logic unit for holding each of the secondary result elements of the second result data as a vector result element of vector result data, a result vector register connected to the result register for storing the vector result data, and a writing unit connected to the result vector register for writing the vector result data into the result vector register. According to this invention, the first readout unit successively reads n primary vector operand elements of the first vector operand data out of the first operand vector register every (M+N+2) machine cycles, where n represents a predetermined integer between 2 and M+N, both inclusive. The second readout unit successively reads n secondary vector operand elements of the second vector operand data out of the second operand vector register every (M+N+2) machine cycles, the writing unit successively writing n vector result elements of the vector result data into the result vector register every (M+N+2) machine cycles, the vector processing apparatus comprising a timing generating unit connected to the first and said second readout units and the writing unit for activating the first and said second readout units and the writing unit by first, second, and third timing signals, respectively, the first timing signal being produced when the second input register is supplied with the secondary result element of the second result data from the second arithmetic logic unit, the second timing signal being produced when the third input register is supplied with the primary result element of the first result data from the first arithmetic logic unit, and the third timing signal being produced when the result register produces the vector result element of the vector result data.

DESCRIPTION OF THE PREFERRED EMBODIMENT

Figure 1:
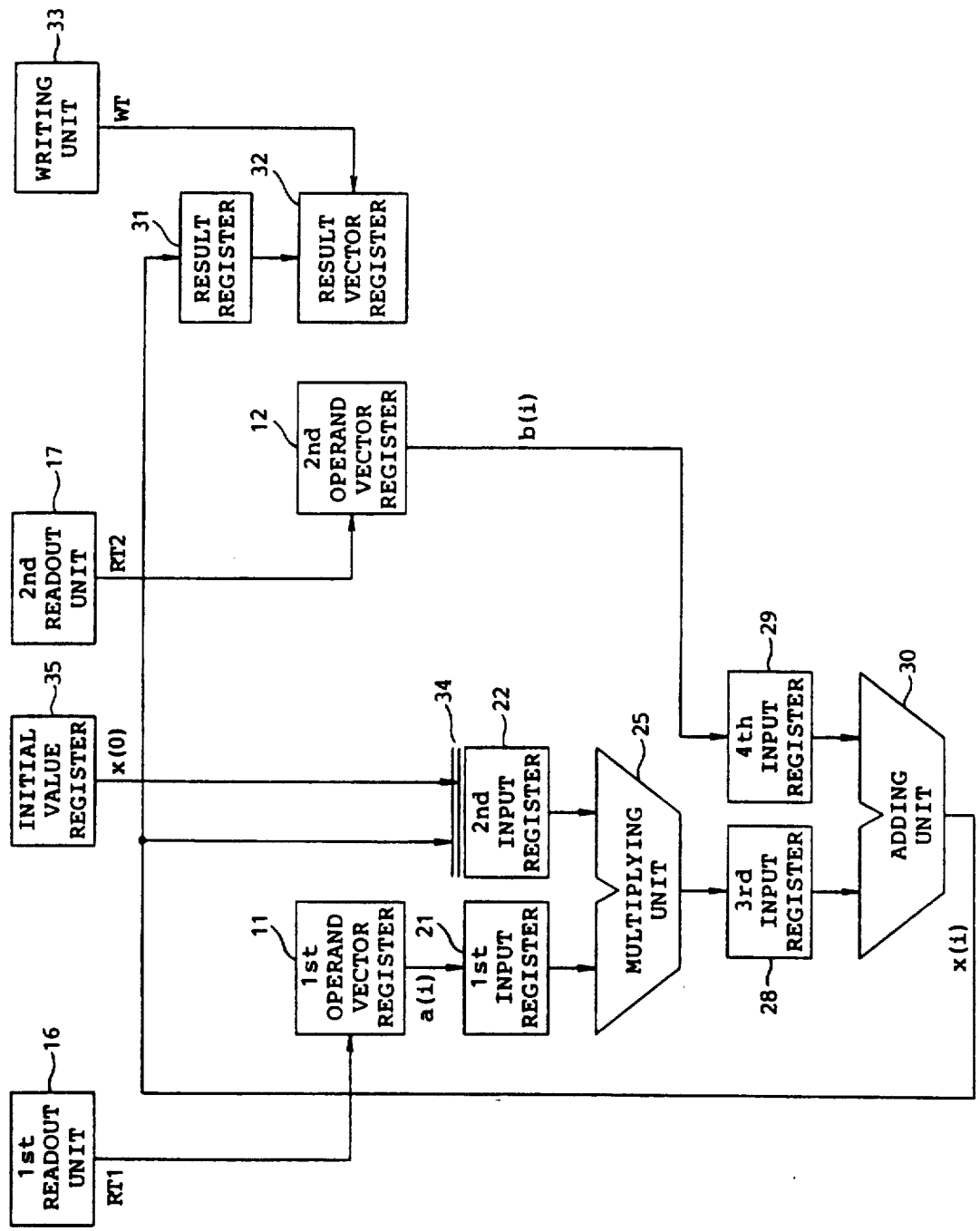
FIG. 1 is a block diagram of conventional vector processing apparatus.

Referring to FIG. 1, a conventional vector processing apparatus will be described first for a better understanding of this invention. The conventional vector processing apparatus is for performing a specific iterative operation given by the above-mentioned particular equation (2):

$$x(i) = b(i) + a(i)^* x(i-1). \quad (2)$$

The conventional vector processing apparatus comprises a first operand vector register 11 for storing a plurality of primary vector operand elements a(i) of first vector operand data and a second operand vector register 12 for storing a plurality of secondary vector operand elements b(i) of second vector operand data.

One of the primary vector operand elements a(i) of the first vector operand data is read as a primary read element out of the first operand vector register 11 in response to a first readout timing signal RT1 supplied from a first readout unit 16. One of the secondary operand elements b(i) of the second vector operand data is read as a secondary read element out of the second operand vector register 12 in response to a second readout timing signal RT2 supplied from a second readout unit 17.

The primary read element a(i) is supplied to a first input register 21 as a primary input element of first input data. A second input register 22 holds a secondary input element x(i−1) of second input data in the manner which will become clear as the description proceeds. The primary input element a(i) of the first input data and the secondary input element x(i−1) of the second input data are supplied to a multiplying unit 25. The multiplying unit 25 carries out a multiplication operation on the primary input element a(i) of first input data and the secondary input element x(i−1) of second input data to produce a primary result element (a(i)*x(i−1)) of first result data.

The primary result element (a(i)*x(i−1)) of first result data is delivered to a third input register 28 as a ternary input element of third input data. The secondary read element b(i) is supplied to a fourth input register 29 as a quaternary input element of fourth input data. The ternary input element (a(i)*x(i−1)) of the third input data and the quaternary input element b(i) of the fourth input data are supplied to an adding unit 30. The adding unit 30 carries out an addition operation on the ternary input element (a(i)*x(i−1)) of the third input data and the quaternary input element b(i) of the fourth input data to produce a secondary result element x(i) of second result data.

The secondary result element x(i) of the second result data is delivered to a result register 31 as a vector result element of vector result data. The vector result element x(i) of the vector result data is written in a result vector register 32 in response to a writing timing signal WT supplied from a writing unit 33.

The secondary result element x(i) of the second result data is also delivered to the second input register 22 through a first selector 34 as a following secondary input element x(i−1) of the second input data. The first selector 34 initially selects an initial value x(0) supplied from an initial value register 35 to supply the initial value x(0) to the second input register 22 as the secondary input element x(i−1) of the second input data.

The first readout unit 16 produces the first readout timing signal RT1 when the secondary result element x(i) of the second result data is supplied to the second input register 22. The second readout unit 17 produces the second readout timing signal RT2 when the primary result element (a(i)*x(i−1)) of the first result data is supplied to the third input register 28.

A descriptive will be made as regards operation of the conventional vector processing apparatus.

Figure 2:
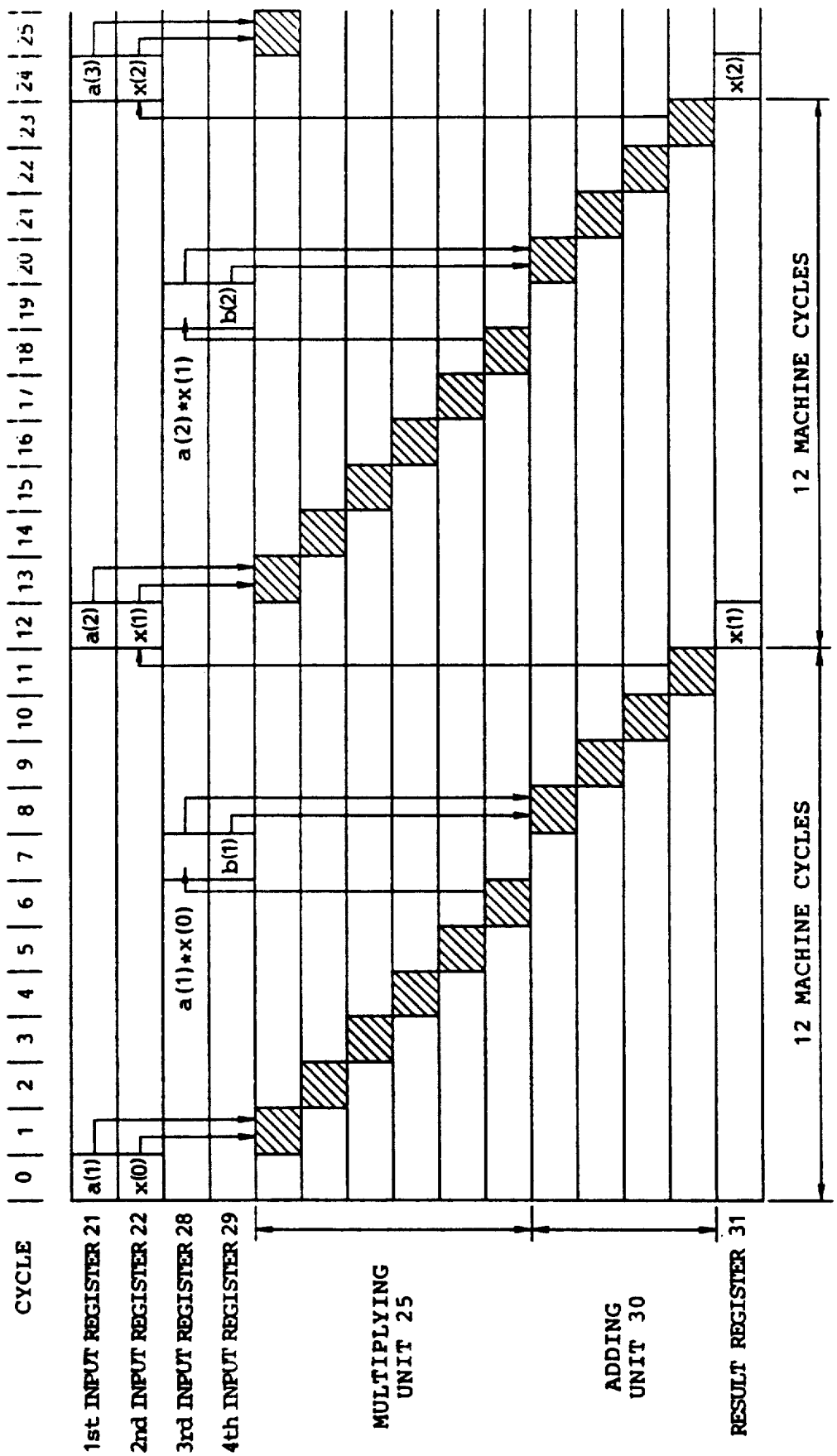
FIG. 2 is a time chart for use in describing iterative operation in the conventional vector processing apparatus shown in FIG. 1.

Referring to FIG. 2 in addition to FIG. 1, attention will be directed to the specific iterative operation given by the above-mentioned particular equation (2). It is assumed that the multiplying unit 25 and the adding unit 30 are operable under six-stage and four-stage pipeline control, respectively. Zeroth through twenty-fifth machine cycles are indicated by numerals 0 through 25 along a first or top line in FIG. 2.

In the zeroth machine cycle represented by 0, the primary read element a(1) is set into the first input register 21 from the first operand vector register 11 as the primary input element of the first input data and the initial value x(0) is set into the second input register 22 from the initial value register 35 through the first selector 34 as the secondary input element of the second input data.

In the first through the sixth machine cycles represented by 1 to 6, the multiplying unit 25 carries out the multiplication operation on the primary input element a(1) of the first input data and the secondary input element x(0) of the second input data to produce the primary result element (a(1)*x(0)) of the first result data at the sixth machine cycle.

In the seventh machine cycle represented by 7, the primary result element (a(1)*x(0)) of the first result data is set into the third input register 28 from the multiplying unit 25 as the ternary input element of the third input data and the secondary read element b(1) is set into the fourth input register 29 from the second operand vector register 12 as the quaternary input element of the fourth input data.

In the eighth through the eleventh machine cycles represented by 8 to 11, the adding unit 30 carries out the addition operation on the ternary input element (a(1)*x(0)) of the third input data and the quaternary input element b(1) of the fourth input data to produce the secondary result element x(1) of the second result data at the eleventh machine cycle.

In the twelfth machine cycle represented by 12, the secondary result element x(1) of the second result data is set into the result register 31 from the adding unit 30 as the vector result element of the vector result data. Simultaneously, the secondary result element x(1) of the second result data is set into the second input register 22 through the first selector 34 as the following secondary input element of the second input data and the primary read element a(2) is set into the first input register 21 from the first operand vector register 11 as the primary input element of the first input data.

Similar processing is repeatedly carried out. As apparent from the above, it takes twelve machine cycles to provide each vector result element x(i) of the vector result data. Therefore, the conventional vector processing apparatus can not give full play to its ability in case of performing the iterative operation.

In order to suppress deterioration in performance of a process as regards the iterative operation, a time-sharing method is disclosed in the specification of the above-mentioned U.S. Pat. No. 4,757,444 by Aoyama et al. According to Aoyama et al, the particular equation (2) is modified into the above-mentioned modified equation as follows:

$$x(i+1) = (b(i)*a(i+1) + b(i+1)) + (a(i)*a(i+1))*x(i-1).$$

The iterative operation given by the above-mentioned modified equation is time-sharingly performed by using the multiplying unit 25 and the adding unit 30. More specifically, each vector result element x(i+1) is calculated with the vector result element x(i+1) divided into first through third phases which are (a(i)*a(i+1)), (b(i)*a(i+1)+b(i+1)), (b(i)*a(i+1)+b(i+1))+(a(i)*a(i+1))*x(i−1), respectively. Therefore, it is necessary to prepare a complex vector register controller for controlling the first and the second operand vector registers 11 and 12 and a switching arrangement for carrying out a switching operation between the first and the second operand vector registers 11 and 12. As a result, vector processing apparatus carrying out the time-sharing method must carry out complex control.

Figure 3:
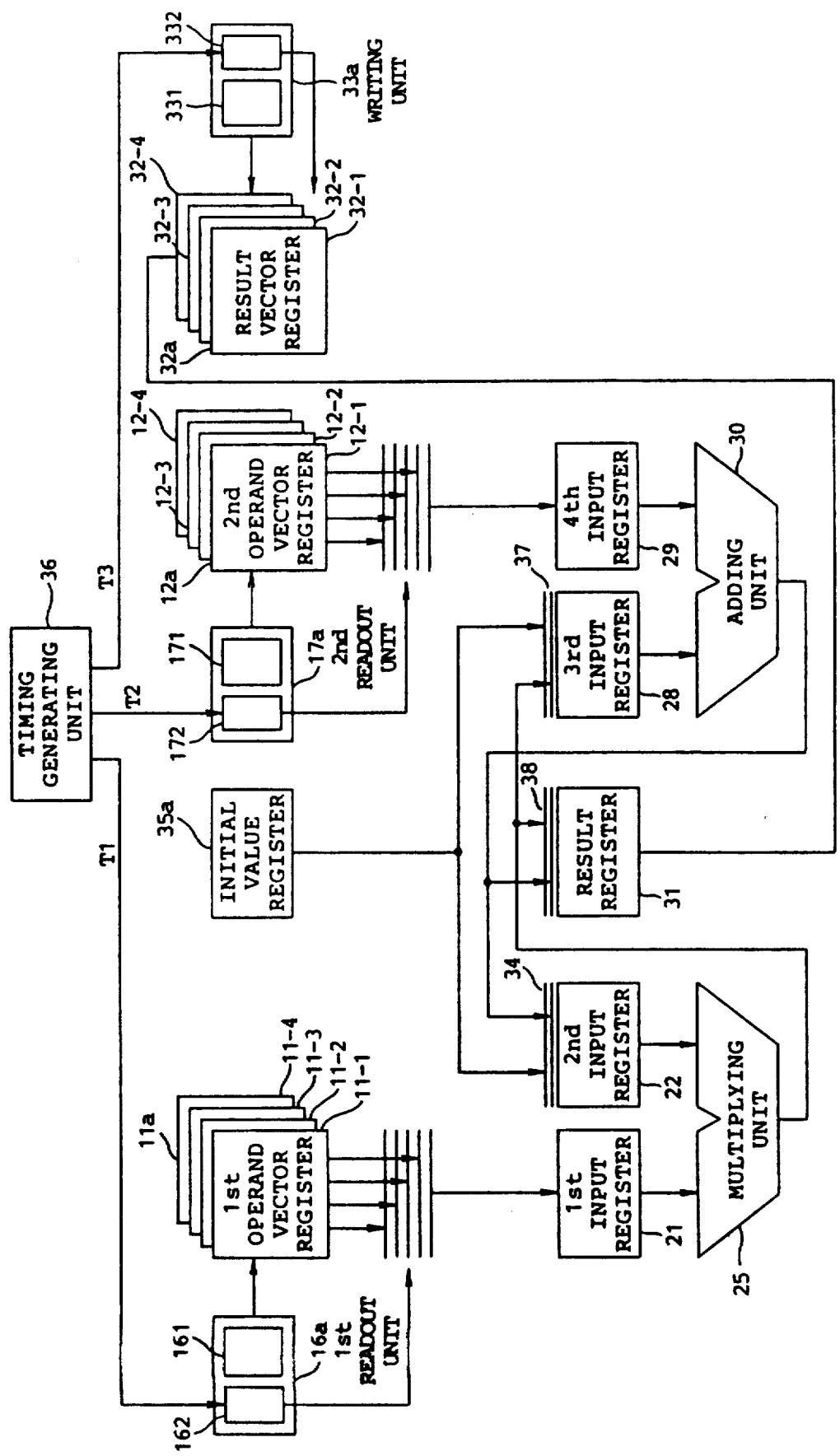
FIG. 3 is a block diagram of vector processing apparatus according to an embodiment of the instant invention.

Turning to FIG. 3, vector processing apparatus according to a preferred embodiment of the present invention is similar to that illustrated in FIG. 1 except that the first and the second operand vector registers, the result vector register, the first and the second readout units, the writing unit, and the initial value register are modified from those illustrated in FIG. 1 as will later become clear. The first and the second operand vector registers, the result vector register, the first and the second readout units, the writing unit, and the initial value register are therefore depicted at 11a, 12a, 32a, 16a, 17a, 33a, and 35a, respectively.

The first operand vector register 11a comprises first through fourth primary partial operand vector registers 11-1, 11-2, 11-3, and 11-4 which store a plurality of primary vector operand elements A(i+3) of first vector operand data in the manner which will later be described. Similarly, the second operand vector register 12a comprises first through fourth secondary partial operand vector registers 12-1, 12-2, 12-3, and 12-4 which store a plurality of secondary vector operand elements B(i+3) of second operand data in the manner which will later be described. Likewise, the result vector register 32a comprises first through fourth partial result vector registers 32-1, 32-2, 32-3, and 32-4 which store a plurality of vector result elements x(i+3) of vector result data in the manner which will later be described.

The first readout unit 16a comprises a first readout circuit 161 and a first data selecting circuit 162. The first readout circuit 161 specifies a first readout address for the first through the fourth primary partial operand vector registers 11-1 to 11-4 to read four primary vector operand elements A(4n), A(4n+1), A(4n+2), and A(4n+3) from the first readout address of the first through the fourth primary partial operand vector registers 11-1 to 11-4 as four primary read elements where n represents a positive integer. The first data selecting circuit 162 successively selects one of the four primary read elements A(4n) to A(4n+3) as a selected primary read element. The selected primary read element is supplied to the first input register 21 as a primary input element of first input data. The first data selecting circuit 162 is activated by a first timing signal T1 supplied from a timing generating unit 36 which will later be described.

Similarly, the second readout unit 17a comprises a second readout circuit 171 and a second data selecting circuit 172. The second readout circuit 171 specifies a second readout address for the first through the fourth secondary partial operand vector registers 12-1 to 12-4 to read four secondary vector operand elements B(4n), B(4n+1), B(4n+2), and B(4n+3) from the second readout address of the first through the fourth secondary partial operand vector registers 12-1 to 12-4 as four secondary read elements. The second data selecting circuit 172 successively selects one of the four secondary read elements B(4n) to B(4n+3) as a selected secondary read element. The selected secondary read element is supplied to the fourth input register 29 as a quaternary input element of fourth input data. The second data selecting circuit 172 is activated by a second timing signal T2 supplied from the timing generating unit 36.

The writing unit 33a comprises a writing circuit 331 and a register selecting circuit 332. The register selecting circuit 332 successively selects one of the first through the fourth partial result vector registers 32-1 to 32-4 as a selected partial result vector register. The writing circuit 331 specifies a writing address for the first through the fourth partial result vector registers 32-1 to 32-4 to write a vector result element supplied from the result register 31 in the writing address of the selected partial result vector register. The register selecting circuit 332 is activated by a third timing signal T3 supplied from the timing generating unit 36.

As mentioned before, the timing generating unit 36 produces the first through the third timing signals T1, T2, and T3. The first timing signal T1 activates the first data selecting circuit 162 when the second input register 22 is supplied with the secondary result element of the second result data from the adding unit 30. The second timing signal T2 activates the second data selecting circuit 172 when the third input register 28 is supplied with the primary result element of the first result data from the multiplying unit 25. The third timing signal T3 activates the register selecting circuit 332 when the result register 31 produces the vector result element of the vector result data.

The initial value register 35a holds initial values x(0), x(1), x(2), and x(3). The initial values x(0) to x(3) are successively supplied to the first selector 34 and a second selector 37. The first selector 34 is supplied with the secondary result element of the second result data. The second selector 37 is supplied with the primary result element of the first result data. In the example being illustrated, the first selector 34 selects the initial values x(0) to x(3) to supply the initial values to the second input register 22 as the secondary input elements of the second input data when the iterative operation is started. Otherwise, the first selector 34 selects the secondary result element of the second result data to supply the secondary result element of the second result data to the second input register 22 as the secondary input elements of the second input data. The second selector 37 always selects the primary result element of the first result data to supply the primary result element of the first result data to the third input register 28 as the ternary input element of the third input data.

A third selector 38 is supplied with the primary result element of the first result data and the secondary result element of the second result data. In the example being illustrated, the third selector 38 always selects the secondary result element of the second result data to supply the secondary result element of the second result data to the result register 31 as the vector result element of the vector result data.

A descriptive will be made as regards operation of the vector processing apparatus illustrated in FIG. 3. The illustrated vector processing apparatus is for performing a particular iterative operation given by a specific equation:

$$x(i+3) = B(i+3) + A(i+3)*x(i-1), \quad (3)$$

where A(i+3) represents each of the primary vector operand elements of the first vector operand data and B(i+3) represents each of the secondary vector operand elements of the second vector operand data.

In order to perform the iterative operation given by the above-mentioned particular equation (2), the above-mentioned particular equation (2) must be modified into the specific equation (3). Therefore, the particular equation (2) is expanded as follows:

$$\begin{aligned}
x(i+3) &= b(i+3) + a(i+3)*x(i+2) \\
&= b(i+3) + a(i+3)*(b(i+2) + a(i+2)*x(i+1)) \\
&= b(i+3) + a(i+3)*b(i+2) + \\
&\quad a(i+3)*a(i+2)*(b(i+1) + a(i+1)*x(i)) \\
&= b(i+3) + a(i+3)*b(i+2) + \\
&\quad a(i+3)*a(i+2)*b(i+1) + \\
&\quad a(i+3)*a(i+2)*a(i+1)*(b(i) + a(i)*x(i-1)) \\
&= b(i+3) + a(i+3)*b(i+2) + \\
&\quad a(i+3)*a(i+2)*b(i+1) + \\
&\quad a(i+3)*a(i+2)*a(i+1)*b(i) + \\
&\quad a(i+3)*a(i+2)*a(i+1)*a(i)*x(i-1).
\end{aligned}$$

In this manner, the primary vector operand element A(i+3) of the first vector operand data of the specific equation (3) and the secondary vector operand element B(i+3) of the second vector operand data of the specific equation (3) are given by:

$$A(i+3) = a(i+3)*a(i+2)*a(i+1)*a(i),$$

and $$B(i+3) = b(i+3) + a(i+3)*b(i+2) + a(i+3)*a(i+2)* \\ b(i+1) + a(i+3)*a(i+2)*a(i+1)*b(i).$$

Therefore, the primary vector operand element A(i+3) and the secondary vector operand element B(i+3) can be preliminarily calculated by a general vector operation.

In addition, the initial values x(1), x(2), and x(3) are from the initial value x(0) given by:

$$x(1) = b(1) + a(1)*x(0),$$

$$x(2) = b(2) + a(2)*x(1),$$

and $$x(3) = b(3) + a(3)*x(2).$$

Therefore, the initial values x(1) to x(3) can be preliminarily calculated by a scalar operation.

As apparent from the specific equation (3), each vector result element x(i+3) of the vector result data is calculated by using only a vector result element x(i−1). Therefore, the vector result element x(i+3) given by the specific equation (3) is divided into first through fourth series which are calculated from the initial values x(0), x(1), x(2), and x(3), respectively. The first through the fourth series are represented by:

x(0), x(4), x(8), x(12), . . . ,
x(1), x(5), x(9), x(13), . . . ,
x(2), x(6), x(10), x(14), . . . ,
and
x(3), x(7), x(11), x(15), . . . .

Inasmuch as the first through the fourth series are independent of one another, it is possible to calculate the first through the fourth series in parallel by using the vector processing apparatus illustrated in FIG. 3 in the manner which will presently be described.

Figure 4:
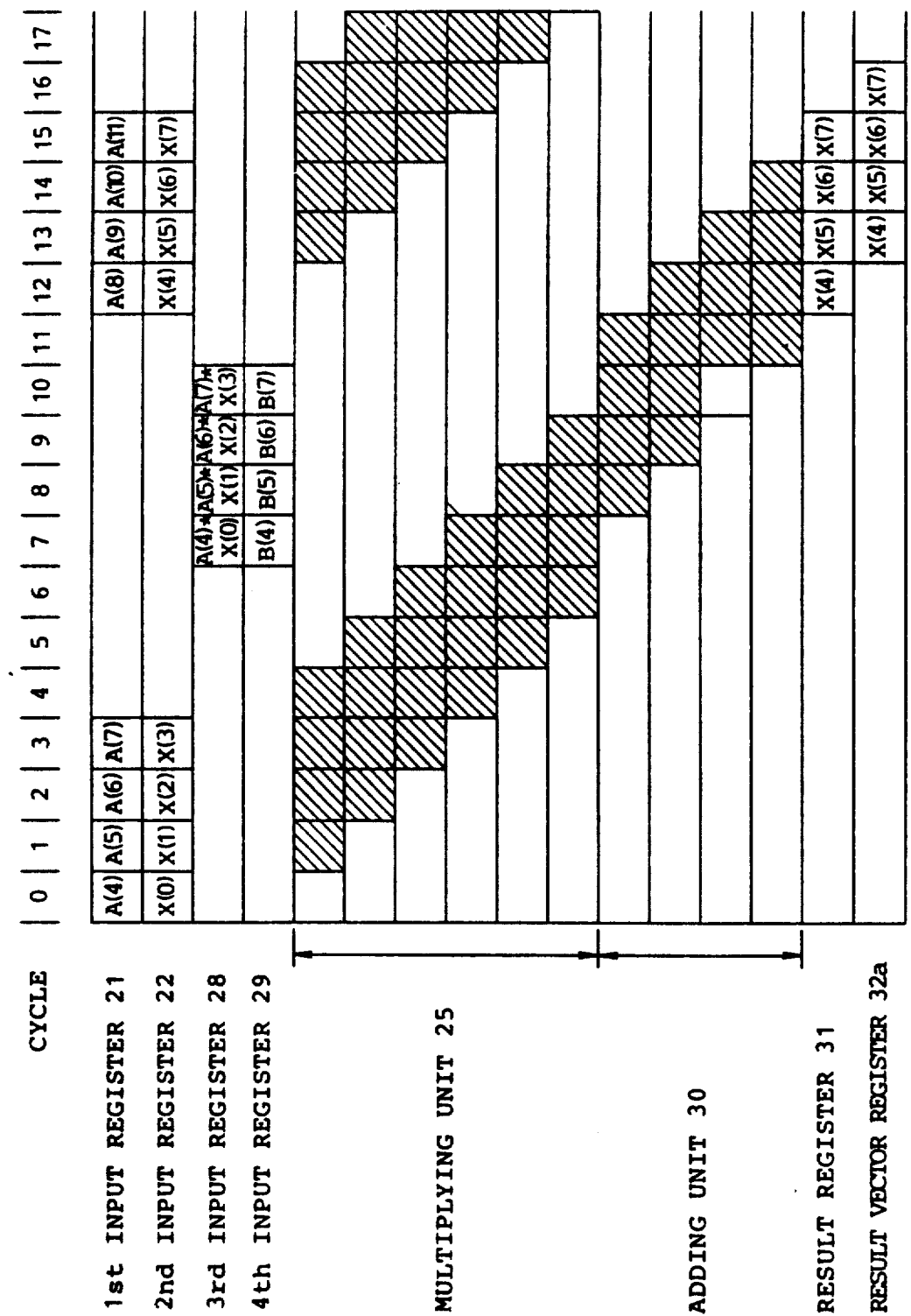
FIG. 4 is a time chart for use in describing iterative operation in the vector processing apparatus shown in FIG. 3.

Referring to FIG. 4 in addition to FIG. 3, attention will be directed to the particular iterative operation given by the above-mentioned specific equation (3). It will be assumed as follows. The multiplying unit 25 and the adding unit 30 are operable under six-stage and four-stage pipeline control, respectively. The initial values x(0), x(1), x(2), and x(3) and the primary vector operand elements A(i+3) and the secondary vector operand elements B(i+3) are preliminarily calculated in the manner described before.

The first operand vector register 11a stores the primary vector operand elements A(i+3) of the first vector operand data. More specifically, the first primary partial operand vector register 11-1 stores the primary vector operand elements A(4n). Similarly, the second primary partial operand vector register 11-2 stores the primary vector operand elements A(4n+1). Likewise, the third and the fourth primary partial operand vector registers 11-3 and 11-4 store the primary vector operand elements A(4n+2) and A(4n+3), respectively. The primary vector operand elements A(4n), A(4n+1), A(4n+2), and A(4n+3) are stored in the same address of the first, the second, the third, and the fourth primary partial operand vector registers 11-1, 11-2, 11-3, and 11-4.

The second operand vector register 12a stores the secondary vector operand elements B(i+3) of the second vector operand data. More particularly, the first secondary partial operand vector register 12-1 stores the secondary vector operand elements B(4n). Similarly, the second secondary partial operand vector register 12-2 stores the secondary vector operand elements B(4n+1). Likewise, the third and the fourth secondary partial operand vector registers 12-3 and 12-4 store the secondary vector operand elements B(4n+2) and B(4n+3), respectively. The secondary vector operand elements B(4n), B(4n+1), B(4n+2), and B(4n+3) are memorized in the same address of the first, the second, the third, and the fourth secondary partial operand vector registers 12-1, 12-2, 12-3, and 12-4.

In FIG. 4, zeroth through seventeenth machine cycles are indicated by numerals 0 through 17 along a first or top line.

In the zeroth through the third machine cycles represented by 0 to 3, the primary vector operand elements A(4), A(5), A(6), and A(7) are successively set into the first input register 21 from the first operand vector register 11a as the primary input elements of the first input data. The initial values x(0), x(1), x(2), and x(3) are successively set into the second input register 22 from the initial value registers 35a through the first selector 34 as the secondary input elements of the second input data.

In the first through the sixth machine cycles represented by 1 to 6, the multiplying unit 25 carries out the multiplication operation on the primary input element A(4) of the first input data and the secondary input element x(0) of the second input data to produce the primary result element (A(4)*x(0)) of the first result data at the sixth machine cycle.

In the second through the seventh machine cycles represented by 2 to 7, the multiplying unit 25 carries out the multiplication operation on the primary input element A(5) of the first input data and the secondary input element x(1) of the second input data to produce the primary result element (A(5)*x(1)) of the first result data at the seventh machine cycle.

In the third through the eighth machine cycles represented by 3 to 8, the multiplying unit 25 carries out the multiplication operation on the primary input element A(6) of the first input data and the secondary input element x(2) of the second input data to produce the primary result element (A(6)*x(2)) of the first result data at the eighth machine cycle.

In the fourth through the ninth machine cycles represented by 4 to 9, the multiplying unit 25 carries out the multiplication operation on the primary input element A(7) of the first input data and the secondary input element x(3) of the second input data to produce the primary result element (A(7)*x(3)) of the first result data at the ninth machine cycle.

In the seventh through the tenth machine cycles represented by 7 to 10, the primary result elements (A(4)*x(0)), (A(5)*x(1)), (A(6)*x(2)), and (A(7)*x(3)) of the first result data are successively set into the third input register 28 from the multiplying unit 25 through the second selector 38 as the ternary input elements of the third input data. The secondary vector operand elements B(4), B(5), B(6), and B(7) are successively set into the fourth input register 29 from the second operand vector register 12a as the quaternary input elements of the fourth input data.

In the eighth through the eleventh machine cycles represented by 8 to 11, the adding unit 30 carries out the addition operation on the ternary input element (A(4)*x(0)) of the third input data and the quaternary input element B(4) of the fourth input data to produce the secondary result element x(4) of the second result data at the eleventh machine cycle.

In the ninth through the twelfth machine cycles represented by 9 to 12, the adding unit 30 carries out the addition operation on the ternary input element (A(5)*x(1)) of the third input data and the quaternary input element B(5) of the fourth input data to produce the secondary result element x(5) of the second result data at the twelfth machine cycle.

In the tenth through the thirteenth machine cycles represented by 10 to 13, the adding unit 30 carries out the addition operation on the ternary input element (A(6)*x(2)) of the third input data and the quaternary input element B(6) of the fourth input data to produce the secondary result element x(6) of the second result data at the thirteenth machine cycle.

In the eleventh through the fourteenth machine cycles represented by 11 to 14, the adding unit 30 carries out the addition operation on the ternary input element (A(7)*x(3)) of the third input data and the quaternary input element B(7) of the fourth input data to produce the secondary result element x(7) of the second result data at the fourteenth machine cycle.

In the twelfth through the fifteenth machine cycles represented by 12 to 15, the secondary result elements x(4), x(5), x(6), and x(7) of the second result data are successively set into the result register 31 from the adding unit 30 through the third selector 38 as the vector result elements of the vector result data. In addition, the secondary result elements x(4), x(5), x(6), and x(7) of the second result data are successively set into the second input register 22 through the first selector 34 as the following secondary input elements of the second result data. The primary vector operand elements A(8), A(9), A(10), and A(11) are successively set into the first input register 21 from the first operand vector register 11a as the primary input elements of the first input data.

In the thirteenth through the sixteenth machine cycles represented by 13 to 16, the vector result elements x(4) to x(7) of the vector result data are successively stored in the first through the fourth partial result vector registers 32-1 to 32-4 of the result vector register 32a.

Similar processing is repeatedly carried out to calculate the vector result elements x(i+3) of the vector result data. As apparent from the above-mentioned, it takes three machine cycles in effect to provide each vector result element x(i+3) of the vector result data. Therefore, it is possible to perform the iterative operation in parallel at a high speed under simple control.

While this invention has thus far been described in conjunction with only one preferred embodiment thereof, it will now readily be possible for those skilled in the art to develop various other embodiments of this invention. For example, the above-mentioned particular equation (2) is generally modified into a modified equation as follows:

$$x(i+(m-1)) = B(i+(m-1)) + A(i+(m-1)) * x(i-1),$$

where m represents a predetermined natural number which is not less than two. In this event, the first operand vector register comprises first through m-th primary partial operand vector registers. The second operand vector register comprises first through m-th secondary partial operand vector registers. The result vector register comprises first through m-th partial result vector registers. In addition, the vector processing apparatus according to this invention may be modified so as to perform a general iterative operation given by a general modified equation which modifies the above-mentioned general equation (1) and which is given by:

$$x(i+(m-1)) = g(x(i-1)),$$

where $g(x(i-1))$ denotes a function of the variable $x(i-1)$.

The aforementioned vector processing apparatus comprises two arithmetic logic units, namely, the multiplying unit 25 and the adding unit 30. However, this invention is not restricted to the above-mentioned embodiment thereof, the vector processing apparatus according to this invention may comprise either only one arithmetic logic unit or three or more arithmetic logic units dependent on the above general modified equation.

What is claimed is:

1. In vector processing apparatus which includes
an operand vector register for storing vector operand data consisting of a plurality of vector operand elements,
a first input register connected to said operand vector register for holding each of said vector operand elements of said vector operand data as a primary input element of first input data,
a second input register for holding a secondary input element of second input data,
an arithmetic logic unit operable under M-stage pipeline control, where M represents a predetermined natural number, and connected to said first and second input registers for carrying out an operation on said first second input data to produce vector result data consisting of a plurality of vector result elements,
a readout unit connected to said operand vector register for reading said vector operand data out of said operand vector register to supply said vector operand data to said first input register as said first input data,
delivering means for delivering said vector result data from said arithmetic logic unit to said second input register as said second input data,
a result register connected to said arithmetic logic unit for holding each of said vector result elements of said vector result data,
a result vector register connected to said result register for storing said vector result data, and
a writing unit connected to said result vector register for writing said vector result data into said result vector register,
the improvement wherein:
said readout unit successively reads n vector operand elements, where n represents a predetermined integer between two and M, both inclusive, of said vector operand data out of said operand vector register every (M+1) machine cycles;
said writing unit successively writing n vector result elements of said vector result data into said result vector register every said (M+1) machine cycles;
said vector processing apparatus comprising
a timing generating unit connected to said readout unit and to said writing unit for activating said readout unit and said writing unit by a readout timing signal and a writing timing signal, respectively,
said readout timing signal being produced when said second input register is supplied with said vector result element of said vector result data from said arithmetic logic unit, and
said writing timing signal being produced when said result register produces said vector result element of said vector result data.

2. In vector processing apparatus which includes
a first operand vector register for storing first vector operand data consisting of a plurality of primary vector operand elements,
a second operand vector register for storing second vector operand data consisting of a plurality of second vector operand elements,
a first input register connected to said first operand vector register for holding each of said primary vector operand elements of said first vector operand data as a primary input element of first input data,
a second input register for holding a secondary input element of second input data,
a first arithmetic logic unit operable under M-stage pipeline control, where M represents a first predetermined natural number, and connected to said first and second input registers for carrying out a first operation on said first and said second input data to produce first result data consisting of a plurality of primary result elements,
a third input register for holding a ternary input element of third input data,
a fourth input register connected to said second operand vector register for holding each of said secondary vector operand elements of said second vector operand data as a quaternary input element of fourth input data,
a second arithmetic logic unit operable under N-stage pipeline control, where N represents a second predetermined natural number, and connected to said third and said fourth input registers for carrying out a second operation on said third and said fourth input data to produce second result data consisting of a plurality of secondary result elements, a first readout unit connected to said first operand vector register for reading said first vector operand data out of said first operand vector register to supply said first vector operand data to said first input register as said first input data, a second readout unit connected to said second operand vector register for reading said second vector operand data out of said second operand vector register to supply said second vector operand data to said fourth input register as said fourth input data, first delivering means for delivering said first result data from said first arithmetic logic unit to said third input register as said third input data, second delivering means for delivering said second result data from said second arithmetic logic unit to said second input register as said second input data, a result register connected to said second arithmetic logic unit for holding each of said secondary result elements of said second result data as a vector result element of vector result data, a result vector register connected to said result register for storing said vector result data, and a writing unit connected to said result vector register for writing said vector result data into said result vector register, the improvement wherein:

said first readout unit successively reads n primary vector operand elements, where n represents a predetermined integer between two and (M+N), both inclusive, of said first vector operand data out of said first operand vector register every (M+N+2) machine cycles;

said second readout unit successively reads n secondary vector operand elements of said second vector operand data out of said second vector register every said (M+N+2) machine cycles;

said writing unit successively writes n vector result elements of said vector result data into said result vector register every said (M+N+2) machine cycles;

said vector processing apparatus comprising a timing generating unit connected to said first and said second readout units and said writing unit for activating said first and said second readout units and said writing unit by first, second, and third timing signals, respectively;

said first timing signal being produced when said second input register is supplied with said secondary result element of said second result data from said second arithmetic logic unit, said second timing signal being produced when said third input register is supplied with said primary result element of said first result data from said first arithmetic logic unit, and said third timing signal being produced when said result register produces said vector result element of said vector result data.

3. In vector processing apparatus which includes first through N-th operand vector registers for storing first through N-th vector operand data, where N represents a predetermined positive integer which is equal to three or more, each of which consists of a plurality of vector operand elements, respectively, first through N-th primary input registers connected to said first through said N-th operand vector registers for holding each of said vector operand elements of said first through said N-th vector operand data as primary input elements of first through N-th primary input data, respectively, first through N-th secondary input registers for holding secondary input elements of first through N-th secondary input data, respectively, first through N-th arithmetic logic units being operable under $M_1$-through $M_N$-stages of pipeline control, respectively, an n-th arithmetic logic unit being connected to an n-th primary input register and an n-th secondary input register for carrying out an n-th operation on n-th primary input data and n-th secondary input data to produce n-th result data consisting of a plurality of result elements, where $M_1$ through $M_N$ represent first through N-th predetermined natural numbers and n represents a variable between one and N, both inclusive, first through N-th readout units connected to said first through said N-th operand vector registers for reading said first through said N-th vector operand data out of said first through said N-th operand vector registers to supply said first through said N-th vector operand data to said first through said N-th primary input registers as said first through said N-th primary input data, respectively, first through (N−1)-th delivering means for delivering said first through said (N−1)-th result data from said first through said (N−1)-th arithmetic logic units to said second through said N-th secondary input registers as said second through said N-th secondary input data, N-th delivering means for delivering said N-th result data from said N-th arithmetic logic unit to said first secondary input register as said first secondary input data, a result register connected to said N-th arithmetic logic unit for holding each of said result elements of said N-th result data as a vector result element of vector result data, a result vector register connected to said result register for storing said vector result data, and a writing unit connected to said result vector register for writing said vector result data into said result vector register, the improvement wherein:

said first through said N-th readout units successively read m vector operand elements of said first through said N-th vector operand data out of said first through said N-th operand registers every $$\left( \sum_{n=1}^{N} M_n + N \right)$$

machine cycles, respectively;

said writing unit successively writing m vector result elements of said vector result data, where m represents a predetermined integer between two and $$\sum_{n=1}^{N} M_n,$$

both inclusive, into said result vector register every said $$\left( \sum_{n=1}^{N} M_n + N \right)$$

machine cycles;

said vector processing apparatus comprising a timing generating unit connected to said first through said N-th readout units and said writing unit for activating said first through N-th readout units and said writing unit by first through N-th readout timing signals and a writing timing signal, respectively;

said first readout timing signal being produced when said first secondary input register is supplied with said secondary input element of said N-th result data from said N-th arithmetic logic unit;

said second through said N-th readout timing signals being produced when said second through said N-th secondary input registers are supplied with said secondary input elements of said first through said (N−1)-th result data from said first through said (N−1)-th arithmetic logic units, respectively; and said writing timing signal being produced when said result register produces said vector result element of said vector result data.

* * * * *